UNITED STATES PATENT OFFICE.

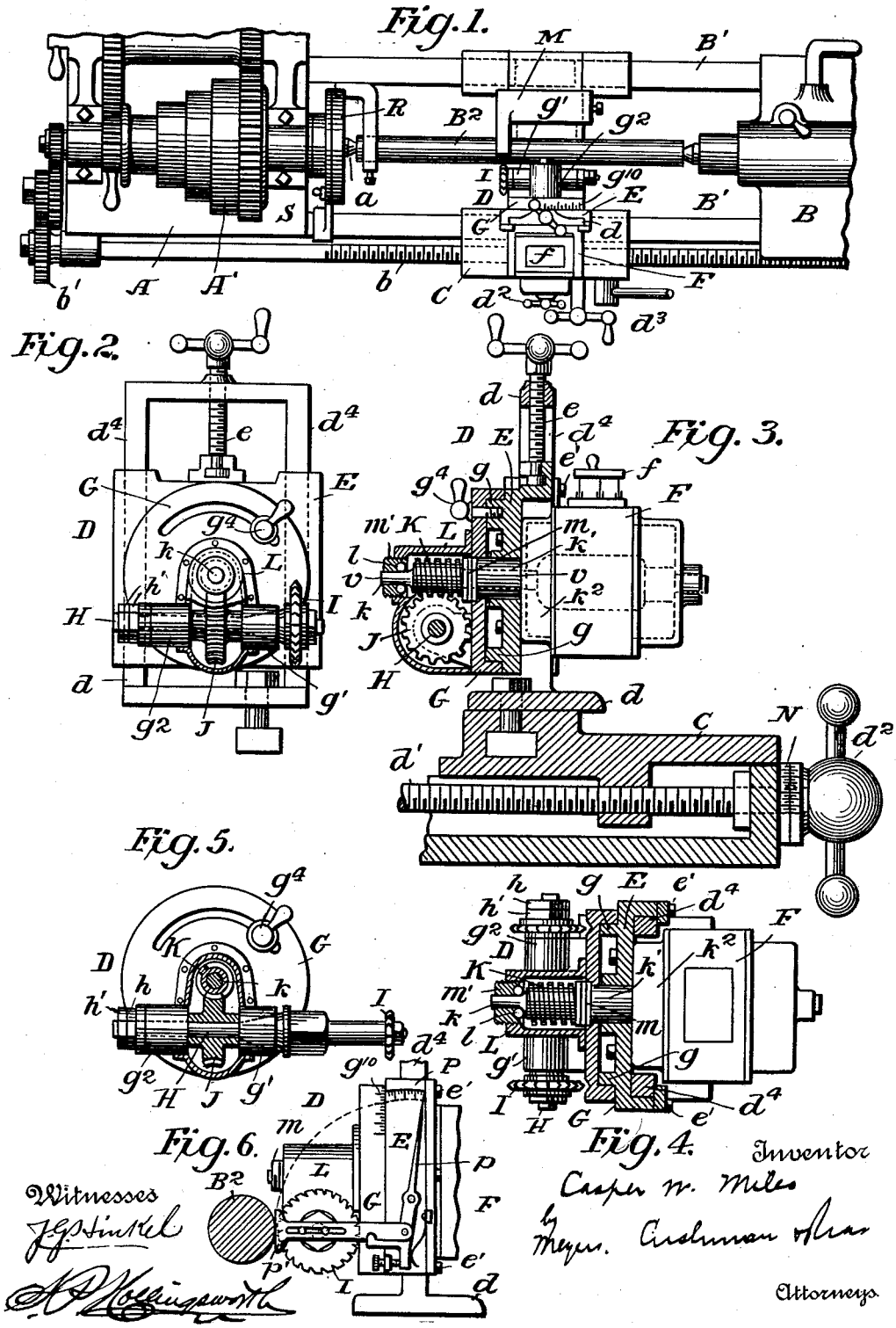
C. W. MILES.
PORTABLE ELECTRICALLY OPERATED TOOL.
APPLICATION FILED JUNE 8, 1910.
1,057,005. Patented Mar. 25, 1913.

CASPER W. MILES, OF ANDERSON TOWNSHIP, HAMILTON COUNTY, OHIO.

PORTABLE ELECTRICALLY-OPERATED TOOL.

1,057,005.

Specification of Letters Patent.   Patented Mar. 25, 1913.

Application filed June 8, 1910.  Serial No. 565,866.

*To all whom it may concern:*

Be it known that I, CASPER W. MILES, a citizen of the United States, residing in Anderson township, in the county of Hamilton and State of Ohio, have invented certain new and useful Improvements in Portable Electrically-Operated Tools, of which the following is a specification.

My invention relates to portable electrically operated tools.

One of its objects is to provide a tool adapted to be used in conjunction with a lathe, or other machine tool for milling threads, slots, grooves and similar operations.

Another object is to provide improved means for transmitting motion from the motor to the milling cutter; to provide for readily effecting various angular adjustments of the cutter, and for varying the height of the cutter.

Another object is to provide means for supplying the cutter with a cooling medium.

It further consists in certain detail of form, combination and arrangement, all of which will be more fully set forth in the description of the accompanying drawings in which—

Figure 1 is a top plan view of a lathe with my improvements attached thereto. Fig. 2 is a front elevation of my improved mechanism detached. Fig. 3 is a side elevation of the same partly in section. Fig. 4 is a sectional detail on line $v$—$v$ of Fig. 3, and showing a modification. Fig. 5 is a view similar to Fig. 2 showing a further modification. Fig. 6 is a side elevation with index attachment.

In the accompanying drawings A represents the headstock of an engine lathe.

A′ represents the cone pulley by means of which the lathe mandrel $a$ is driven.

B represents the lathe tail stock, B′ the lathe ways, B² the work, $b$ the carriage feed screw, $b'$ a series of change gears by means of which the screw $b$ is driven from mandrel $a$, and by changes of which the desired speed of the screw $b$ relative to the mandrel $a$ is obtained.

C represents the lathe carriage which is adapted to be fed along the ways B′ by means of screw $b$.

My improved tool D is designed to be attached to the carriage C or to the tool carriage of other machine tools whenever required for use. The tool D is carried by a frame $d$ rigidly attached to the carriage so as to be fed to and from the work by means of the carriage cross feed screw $d'$, usually by a hand crank $d^2$, as well as along the ways B′ either by screw $b$ or by hand feed crank $d^3$. The frame $d$ is provided with ways $d^4$. Mounted upon ways $d^4$ is a plate E which is adjustable on ways $d^4$ by means of a feed screw $e$ preferably journaled to plate E and having threaded engagement with frame $d$. Plate E is also adapted to be rigidly clamped to frame $d$ by means of bolts $e'$.

Plate E has rigidly attached thereto an electrical motor F, which is preferably arranged to be driven in either direction or stopped by shifting the switch lever of an electric switch $f$. On the opposite side of the plate E is mounted a circular plate G which journals by means of offsets $g$ upon the face of plate E so as to be adjusted to varying angles relative to plate E through a range of over ninety degrees so as to enable the tool carried by plate G to be set in either a horizontal or vertical position or any intermediate position required, and locked by bolt $g^4$. A scale $g^{10}$ is provided on the circular face of plate G and a pointer or finger on plate E to facilitate accurate and ready adjustment of plate G. Plate G is provided with journal boxes $g'$, $g^2$ to support a rotary shaft H. Shaft H is preferably tapered at its forward end to fit a tapered seat in box $g'$, and is adapted to be drawn up by nuts $h$, $h'$ to a close adjustment in box $g'$ and to take up end play of shaft H.

I represents a circular toothed cutter mounted upon the forward end of shaft H. The shaft H is driven by means of a worm wheel J mounted thereon and receiving motion from a worm K mounted on the projecting end $k$ of the motor armature shaft.

I preferably arrange for the bearing $k'$ of the motor head $k^2$ to project into or through an opening into plate G to serve as one bearing for the armature shaft, such bearing may, however, be formed in plate G if desired.

L represents a housing for worm K, which housing is attached to or formed integral with plate G, and is provided with a journal bearing $l$ to support the end of the armature shaft. $m$, $m'$ represent thrust collars, preferably of the ball bearing type which are adjustable to take up the end thrust of the armature shaft in either direction, thus causing the worm to drive the worm wheel with a minimum amount of vibration, which is important in performing accurate work.

Where long shafts, or shafts of small diameter are to be threaded, I provide a detachable bracket M carried by the tool carriage and supporting the work at the point where the cutter is operating, or slightly in advance of the cutter, to prevent the work springing away from the cutter.

Where the lathe or other machine tool is provided with an index, as at N, Fig. 3, on the tool carriage cross feed screw, this index may be employed in setting the tool I to cut a thread or other groove of the desired depth by first feeding the cutter I so as to just contact with the face of the work, and then feeding it forward slowly the desired number of divisions on the index N. Where the tool carriage is not provided with an index N, I provide an index plate P carried preferably by plate E, and across which travels a pivoted spring actuated pointer p. The arm p' of the pointer p is adjusted to touch the face of the work at the same time that the cutter first contacts with the face of the work. The cutter is then fed forward until the pointer p indicates the desired depth, due to arm p' yielding when pressed against the work, after which the arm p' which is pivoted to arm p may be drawn away from the work and latched in position indicated by dotted line Fig. 6 where it will be out of the way.

In practice my improved tool is adjusted to position upon the tool carriage of a lathe or other tool, and connected by a flexible cord with a source of electricity. The plate C is adjusted to set the tool to the desired angle, the motor started and the tool fed to position to make a cut of the desired depth. The lathe or other tool may then be started or intermittently shifted if desired, and the tool carriage fed by means of screw b or by hand as desired.

Where it is desired to cut a thread the carriage is fed by screw b at the ratio necessary to cut a thread of the desired pitch. Where it is desired to cut internal threads I preferably reverse the motor and employ a tool of the character indicated in Fig. 5 attached to tool spindle H. For slotting taps, reamers, or cutting gears, an index plate R is carried by the chuck or headstock and a pin carried by arm S enters the respective holes in the index plate to lock the work in position for the respective cuts to secure the desired spacing of the cuts.

The mechanism herein illustrated and described is capable of considerable modification without departing from the principle of my invention as defined in the appended claims.

Having described my invention, what I claim is:

1. In a mechanism of the character indicated, a frame adapted to be detachably attached to the tool carriage of a metal working tool, said frame being provided with ways, a plate adjustable on said ways, a head attached to said plate and pivotally adjustable relative thereto, an electric motor secured on said plate with its shaft extending therethrough and through said head on its axes of rotation, a tool shaft journaled in bearings carried by said head, and worm gearing between said tool shaft and the motor shaft.

2. In a mechanism of the character indicated, a frame adapted to be rigidly attached to the tool carriage of a machine tool, said frame being provided with ways, a plate adjustable on said ways, an electric motor carried by said plate, a worm mounted on the shaft of said motor, a head pivotally attached to said plate concentrically with said shaft, a tool shaft journaled in bearings carried by said head, and a worm wheel on said tool shaft adapted to transmit motion from said worm to said tool shaft.

3. In a mechanism of the character indicated, a frame adapted to be rigidly attached to the tool carriage of a machine tool, said frame being provided with ways, a plate adjustable vertically on said ways, an independent motor fixed on said plate through which the motor shaft extends, a worm on said motor shaft, a tool shaft, bearings therefor carried by said plate and adapted to rock about the axis of the motor shaft, and a worm wheel on the tool shaft in engagement with said worm for transmitting motion to said tool shaft.

4. In a mechanism of the character indicated, a frame adapted to be rigidly attached to the tool carriage of a machine tool, said frame being provided with ways, a plate adjustable on said ways, an independently operating motor carried by said plate, a worm on the shaft of and driven by said motor, a head pivotally attached to said plate concentric with the axis of the motor shaft, a tool shaft journaled in bearings carried by said head, a worm wheel on the tool shaft for transmitting motion from said worm to said shaft, said head being adjustable relative to said plate around the motor shaft to adjust the angular position of said tool shaft relative to said plate without disengaging the worm and worm-wheel.

5. In a mechanism of the character indicated, a frame adapted to be rigidly attached to the tool carriage of a machine tool, said frame being provided with ways, a plate adjustable on said ways, an electric motor carried by said plate, a worm driven by said motor, a head pivotally attached to said plate concentric with the axis of said worm, a tool shaft journaled in bearings carried by said head, a worm wheel transmitting motion from said worm to said shaft, said head being adjustable relative to said plate to adjust the position of said tool shaft relative to said plate without disengaging the worm and worm wheel and an index carried by said head.

6. In a mechanism of the character indicated, a frame adapted to be rigidly attached to the tool carriage of a machine tool, an independent motor carried by said frame, a worm driven by said motor, a head pivotally adjustable concentrically with the axis of said worm, a tool shaft journaled in bearings carried by said head, and a worm wheel mounted on said shaft and transmitting motion from said worm to said shaft.

7. In a mechanism of the character indicated, a frame adapted to be rigidly attached to the tool carriage of a machine tool, said frame being provided with ways, a plate adjustable on said ways, an independent motor attached to one side of said plate and movable therewith, one end of the motor shaft projecting through said plate, a worm on said projecting end of the armature shaft, a tool shaft journaled in bearings carried by said plate, and a worm wheel mounted on said shaft and transmitting motion from said worm to the tool shaft.

8. In a mechanism of the character indicated, a frame adapted to be rigidly attached to the tool carriage of a machine tool, said frame being provided with ways, a plate adjustable on said ways, an independent electric motor attached to one side of said plate and movable therewith with one end of its shaft projecting through said plate, a worm on said projecting end of the armature shaft, a head pivotally attached to the opposite side of said plate concentric with the axis of said shaft, a tool shaft journaled in bearings carried by said head, and a worm wheel mounted on said tool shaft to transmit motion from said worm to said tool shaft in whatever position the head may be adjusted.

In testimony whereof I have affixed my signature in presence of two witnesses.

CASPER W. MILES.

Witnesses:
C. H. BARTH,
B. R. KROPF.